April 18, 1950     C. J. DE GRAVE, JR     2,504,254
SCALE ILLUMINATING MEANS FOR PROJECTION LENSES
Filed May 15, 1948
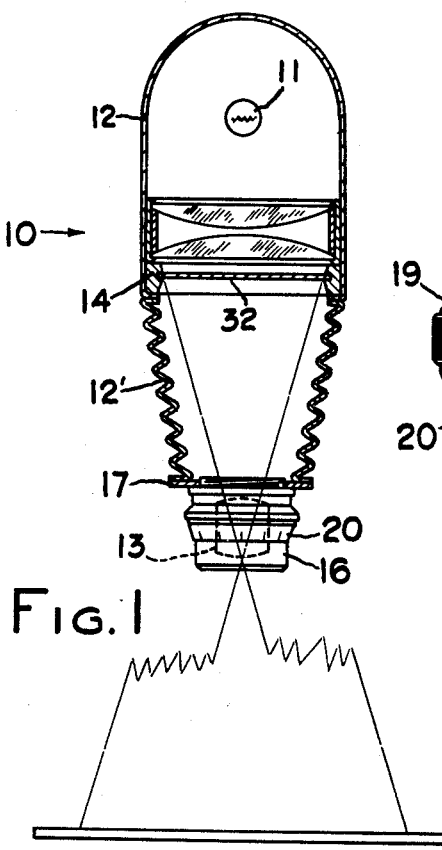
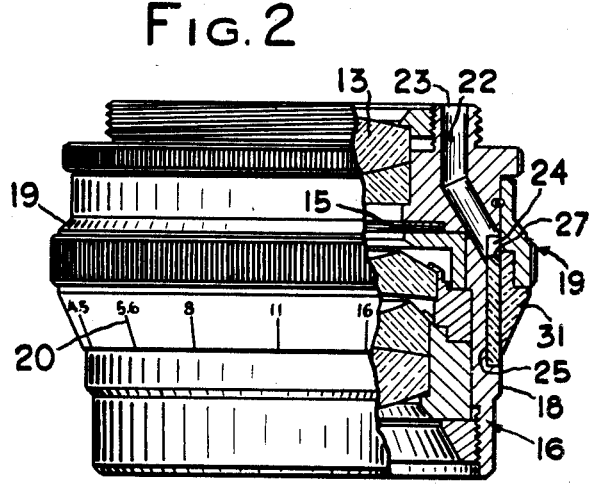
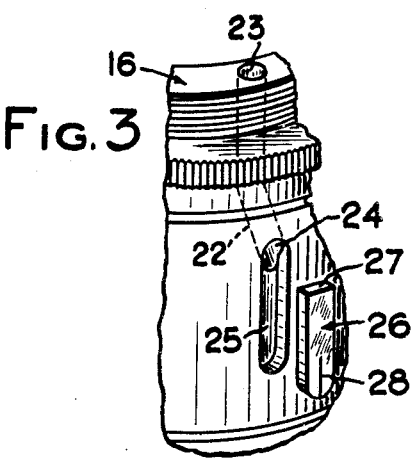
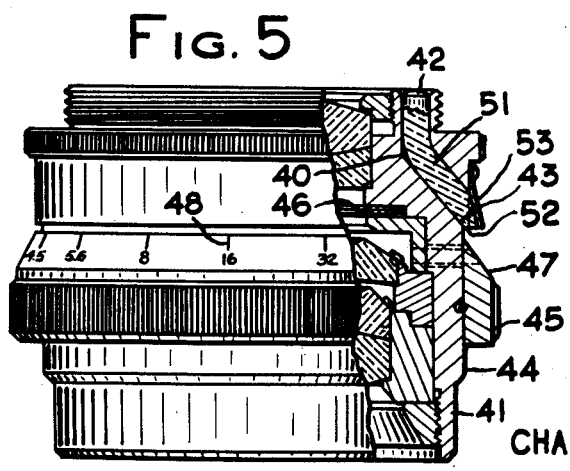
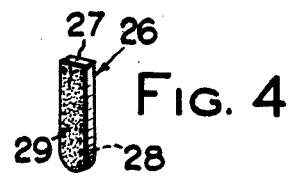
Inventor
CHARLES J. DeGRAVE JR.
Attorney Patented Apr. 18, 1950

2,504,254

UNITED STATES PATENT OFFICE 2,504,254

SCALE ILLUMINATING MEANS FOR PROJECTION LENSES

Charles J. De Grave, Jr., Chili, N. Y., assignor to Bausch & Lomb Optical Company, Rochester, N. Y., a corporation of New York Application May 15, 1948, Serial No. 27,214

6 Claims. (Cl. 240—2.1)

This invention relates to projection apparatus embodying an objective lens and more particularly it has reference to means for illuminating diaphragm scales or the like which are carried by the lens mounting. Since apparatus of this type for making photographic enlargements, for example, is commonly used in a dimly lighted or darkened room, it is difficult to read the scale on the lens mounting when making necessary diaphragm settings.

One of the objects of this invention is to provide means for illuminating a scale on the lens mounting of a projection apparatus. Another object is to provide in a projection apparatus means whereby rays from the light source are used to illuminate a scale carried by the objective lens mounting. A further object is to provide a mounting for a projection lens having means whereby a scale on the outer portion of the mounting may be illuminated by light rays from the lamp of the projector in which the lens is used. These and other objects and advantages reside in certain novel features of construction, arrangement and combination of parts as will hereinafter be more fully described and pointed out in the appended claims.

In the drawing,

Fig. 1 is a diagrammatic view of a photographic enlarging projector incorporating this invention, Fig. 2 is an enlarged side elevation, partly in section, of a lens mounting embodying the invention, Fig. 3 is a perspective view of certain parts of this invention, Fig. 4 is a perspective view of a detail of the invention, and Fig. 5 is a view similar to Fig. 2 of a second embodiment of this invention.

The projection apparatus, as shown generally at 10 in Fig. 1 of the drawing, comprises a light source 11, a housing 12 therefor, an objective lens 13 and a transparency holder 14. The lens 13 has associated therewith a diaphragm 15, both the lens and diaphragm being secured within a lens barrel 16 which is suitably attached to a lens board 17 secured to the end of bellows 12'. On the exterior surface 18 of the lens barrel 16 there is rotatably mounted a diaphragm ring 19 which actuates the diaphragm 15. On a beveled outer surface of the diaphragm ring 19 a scale 20, calibrated for various degrees of opening of the diaphragm 15, is formed. All the above-recited structure is of conventional form as found in many types of photo enlargers.

In order to provide illumination means for the scale 20 when the projector is used in a dark room, a passageway 22 is formed in the wall of the lens barrel 16 so as to conduct light rays from the source 11 to the scale 20. The upper outlet 23 for the passageway is located in the upper end of the lens barrel facing the light source and the lower outlet 24 is located closely adjacent to the scale 20. In the preferred form of this invention, the lower outlet 24 is extended into an elongated recess 25 which is positioned beneath the scale 20 in the surface 18. The walls of the passageway 22 and recess 25 are burnished or polished so as to reflect light rays or they may be coated with a suitable material so as to render them reflective of the light rays.

Although unnecessary to the proper operation of this invention, effective lighting of scale 20 is enhanced by fixing a block 26 of transparent material, such as the thermoplastic methyl methacrylate, in the recess 25. At the top of the block 26, a polished entrance surface 27 is provided, spaced from the top of recess 25, so that light rays from the passageway 22 may enter the block by refraction. An opaque index mark 28 is formed preferably on the front face of block 26 in alignment with the scale 20. The rear face 29 (Fig. 4) of the block is ground or roughened so that it functions as a diffusely illuminated background. If desired, the block 26 may be suitably colored so as to prevent passage of light rays of undesirable wavelength.

In the preferred form of the invention, the characters of scale 20 are seen in silhouette against the illuminated background surface 29. This result is attained by forming that portion of the diaphragm ring 19, which overlies the recess 25 and on which the scale 20 is formed, as a light transmitting ring 31. Any suitable light transmitting material, such as the thermoplastic methyl methacrylate, may be used for the ring 31 which is suitably fixed to the diaphragm ring 19 so as to rotate therewith. It is not necessary that the ring 19 be light-transmitting throughout its entire length so long as light-transmitting portions are provided for the scale divisions.

In operation of the device, light rays from the source 11 pass through the condensing lenses and transparency 32 and into the objective lens 13. Since the outlet 23 is formed in the end of the barrel 16 which faces the light source, diffused light rays will enter the outlet 23 in sufficient amount to illuminate the scale 20. These rays will be reflected by the wall of the passageway and thereby be directed onto the top of the transparent block 26. The opaque characters of scale 20 and the fiducial line 28 will thereby appear in silhouette against the bright background formed by the block 26.

In the modification shown in Fig. 5, a passageway 40 is formed in a lens barrel 41 so as to connect an upper outlet 42, facing the light source 11, to an outlet 43 in the exterior surface 44 of the barrel. Adjacent the outlet 43, an opaque diaphragm ring 45 is journaled on surface 44 and is operatively connected to move a diaphragm 46. Contiguous to the outlet 43, the diaphragm ring carries a beveled surface 47 on which a scale 48 is engraved. The scale 48 cooperates with an index mark, not shown, on the surface 44 to show the operative position of the diaphragm 46. In the passageway 40, a polished light-conducting member 51 is suitably fixed so as to project outwardly from the outlet 43 beyond the surface 44. Preferably, member 51 is made of a transparent thermoplastic material such as the commercial product "Lucite." A polished optical surface 52 is formed on the projecting portion of the light-conducting member 51 facing toward the scale 48 and a protective cap 53 may be suitably fixed to the barrel 41 over the projecting end of the light-conducting member.

In operation, diffused light rays emanating from the source 11 enter the light-conducting member 51 at the outlet 42 in the same manner as in the first embodiment and are internally reflected therethrough to emerge from the optical surface 52 and impinge directly upon the opaque scale 48.

It is not necessary to the successful operation of the second embodiment just described, that the light-conducting member 51 be continuous throughout the passageway 40 so long as means, such as the optical surface 52, are provided for directing light rays upon the scale. Member 51 may also be made of light-filtering material if desired to further assure safe use of the scale illumination. In assembling the particular form of light-conducting member shown in Fig. 5, member 51 must be softened before inserting in the passageway 40 but upon hardening, the member is self-locking in a fixed position therein.

From the foregoing it will be apparent that I am able to attain the objects of my invention and provide improved means for illuminating the scales carried by objective lenses in projectors. Since the light passageway is formed in the wall of the lens barrel, the invention provides a compact structure with its attendant advantages. This structure also places the light receiving outlet of the passageway closely adjacent to the cone of light rays projected towards the objective so that diffused light rays in ample amount are received for illuminating the scale.

Although but certain embodiments of this invention have been shown and described in detail, it will be apparent that many other forms are possible and changes may be made in the shape and arrangement of the parts and substitutions may be made without departing from the spirit of the invention as defined in the appended claims.

I claim:

1. In a projection apparatus adapted for dark room use having a light source and an objective lens provided with a scale exteriorly of the lens barrel, the combination of means for illuminating said scale comprising a light reflecting wall forming a passageway in the side of the lens barrel, said passageway connecting an outlet formed in the outer surface of the barrel adjacent the scale and an outlet formed in the end of the barrel adjacent the light source whereby light rays from the source are directed through the passageway and onto the scale.

2. In a projection apparatus adapted for dark room use having a light source and an objective lens provided with a scale exteriorly of the lens barrel, the combination of means for illuminating said scale comprising a passageway formed in the side of the lens barrel, said passageway terminating in an outlet formed in the outer surface of the barrel and in an outlet formed in the end of the barrel which faces the light source, and means within the passageway for transmitting by reflection light rays which emanate from said source whereby said scale is illuminated.

3. In a projection apparatus adapted for dark room use having a light source and an objective lens provided with a scale exteriorly of the lens barrel, the combination of means for illuminating said scale comprising a passageway formed in the wall of the lens barrel and terminating in an outlet formed in the outer surface of the barrel adjacent the scale and in an outlet formed in that end of the barrel which faces the light source, and a light transmitting member located in said passageway adjacent to said scale so as to direct light rays from the source through said passageway and onto the scale.

4. In a projection apparatus adapted for dark room use and having a light source and an objective lens provided with a diaphragm adjusting ring carrying a scale, the combination of an arcuate member secured to the ring, said member being formed of light transmitting material on which the scale is formed with opaque characters, and means for illuminating the scale comprising a passageway formed in the wall of the lens barrel, said passageway connecting a first outlet formed in the outer surface of the lens barrel and a second outlet formed in the end of the lens barrel which faces the light source, a light-transmitting and diffusing element positioned in alignment with the second outlet and underneath said arcuate member, said element carrying a fiducial mark adapted to cooperate with the scale whereby light rays from the source render the scale readable in a darkened room.

5. In a projection apparatus adapted for dark room use having a light source and an objective lens provided with a diaphragm scale exteriorly of the lens barrel, the combination of means for illuminating said scale comprising a passageway formed in the wall of said lens barrel so as to connect two outlets, one of said outlets being located in the outer surface of said wall and the other outlet being located in the end of the barrel which faces said source, a block of light-transmitting material fixed in the wall at the first-mentioned outlet and having an outwardly-facing reflecting background surface thereon, and a transparent annulus mounted on said outer surface so as to overlie said background surface and having the scale formed thereon whereby light rays from said source are directed through said passageway and block to illuminate said background surface so that the scale may be seen by contrast against the illuminated background surface.

6. In a projection apparatus adapted for dark room use having a light source and an objective lens provided with a diaphragm scale exteriorly of the lens barrel, the combination of means for illuminating said scale comprising a passageway formed in the wall of said lens barrel so as to connect two outlets, one of said outlets being located in the outer surface of said wall and the other outlet being located in a surface of the barrel which faces said source, and a light-transmitting member extending through said passageway and having an optical surface thereon in proximity to said scale whereby light rays from said source are directed along said passageway and member to impinge upon said scale.

CHARLES J. DE GRAVE, Jr.

REFERENCES CITED

The following references are of record in the file of this patent:

UNITED STATES PATENTS

| Number | Name | Date |
|---|---|---|
| 1,662,150 | Kerr | Mar. 13, 1928 |
| 1,875,048 | Levene | Aug. 30, 1932 |
| 1,963,289 | Brehm | June 19, 1934 |